United States Patent
Hattori

(10) Patent No.: US 7,730,871 B2
(45) Date of Patent: Jun. 8, 2010

(54) FUEL INJECTION CONTROL METHOD FOR A DIRECT INJECTION SPARK IGNITION INTERNAL COMBUSTION ENGINE

(75) Inventor: Fumiaki Hattori, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 119 days.

(21) Appl. No.: 12/162,867

(22) PCT Filed: Jul. 27, 2007

(86) PCT No.: PCT/IB2007/002149

§ 371 (c)(1),
(2), (4) Date: Jul. 31, 2008

(87) PCT Pub. No.: WO2008/012667

PCT Pub. Date: Jan. 31, 2008

(65) Prior Publication Data

US 2009/0177364 A1    Jul. 9, 2009

(30) Foreign Application Priority Data

Jul. 28, 2006 (JP) ............................ 2006-207022

(51) Int. Cl.
*F02B 3/00* (2006.01)
(52) U.S. Cl. .................. 123/299; 123/300; 123/301; 123/305; 701/105
(58) Field of Classification Search .................. 123/295, 123/299, 300, 301, 305; 701/103, 104, 105
See application file for complete search history.

(56) References Cited

U.S. PATENT DOCUMENTS

| | | | |
|---|---|---|---|
| 6,340,014 B1 * | 1/2002 | Tomita et al. ............... | 123/295 |
| 6,745,743 B2 * | 6/2004 | Abo et al. ................... | 123/295 |
| 6,912,989 B2 * | 7/2005 | Tayama et al. .............. | 123/276 |
| 6,983,732 B2 * | 1/2006 | Kuo et al. ................... | 123/299 |
| 7,128,047 B2 * | 10/2006 | Kuo et al. ................... | 123/299 |
| 7,159,566 B2 * | 1/2007 | Tomita et al. .......... | 123/406.47 |
| 7,165,526 B2 * | 1/2007 | Nakayama et al. .......... | 123/298 |
| 7,194,999 B2 * | 3/2007 | Kono et al. ............. | 123/406.47 |
| 7,357,122 B2 * | 4/2008 | Basaki et al. ............... | 123/478 |
| 7,509,944 B2 * | 3/2009 | Okamura .................... | 123/478 |

(Continued)

FOREIGN PATENT DOCUMENTS

EP    1 589 208    10/2005

(Continued)

*Primary Examiner*—Thomas N Moulis
(74) *Attorney, Agent, or Firm*—Oblon, Spivak, McClelland, Maier & Neustadt, L.L.P.

(57) ABSTRACT

A direct injection spark ignition internal combustion engine including a controller that controls a fuel injector to perform a plurality of fuel injections to inject a necessary amount of fuel during an intake stroke, or from an intake stroke to a first half of a compression stroke, when homogeneous combustion is to be performed. The fuel injection control sets an injection prohibition period, in which injection of the fuel is prohibited, to a middle of the intake stroke. The injection prohibition period is decreased as the engine speed and as the intake air pressure increase. In addition, the amount of fuel injected before the injection prohibition period is reduced, and the amount of fuel injected after the injection prohibition period is increased, as the engine speed decreases.

12 Claims, 6 Drawing Sheets

U.S. PATENT DOCUMENTS

| | | | |
|---|---|---|---|
| 7,574,989 B2 * | 8/2009 | Nakamura et al. | 123/179.4 |
| 7,591,243 B2 * | 9/2009 | Idogawa et al. | 123/299 |
| 2005/0011484 A1 * | 1/2005 | Wagner et al. | 123/295 |

FOREIGN PATENT DOCUMENTS

| | | |
|---|---|---|
| JP | 10 159619 | 6/1998 |
| JP | 0 919 711 | 6/1999 |
| JP | 2002 161790 | 6/2002 |
| JP | 2004 519617 | 7/2004 |
| WO | 2006 070259 | 7/2006 |

* cited by examiner

FUEL INJECTION CONTROL METHOD FOR A DIRECT INJECTION SPARK IGNITION INTERNAL COMBUSTION ENGINE

BACKGROUND OF THE INVENTION

1. Field of the Invention

The present invention relates to a direct injection spark ignition internal combustion engine in which fuel is injected from one side of a cylinder bore toward the cylinder bore wall on the opposite side of the cylinder bore such that the injected fuel rides on an intake air flow during an intake stroke, and a fuel injection control method for such an internal combustion engine. More specifically, the present invention relates to a direct injection spark ignition internal combustion engine that reduces dilution of oil by fuel that strikes the cylinder bore wall, and that effectively utilizes the latent heat of fuel evaporation and the effect of disturbance by a fuel jet, during homogeneous combustion to improve the homogeneity of an air-fuel mixture, and a fuel injection control method for such an internal combustion engine.

2. Description of the Related Art

In a conventional gasoline direct injection engine in which fuel is injected from one side of a cylinder bore (for example, between two intake valves) toward the cylinder bore wall one the opposite side such that the injected fuel rides on an intake air flow during an intake stroke.

In this type of engine, it is desirable to more or less reduce the penetration of fuel spray in order to improve the homogeneity during homogeneous combustion and reduce generation of low-temperature smoke and hydrocarbon (HC). It is also desirable to increase the injection angle (installation angle) in order to reduce fuel adhesion to a piston.

With this in view, there is proposed a related art providing a fuel control device for a direct injection type spark ignition internal combustion engine that includes a fuel injector for directly injecting fuel into a combustion chamber and an ignition plug, and that performs stratified operation, in which fuel is sprayed in a concentrated manner toward the vicinity of the ignition plug, and homogeneous operation, in which fuel is sprayed in a distributed manner all over the combustion chamber, according to engine operating conditions. This fuel control device includes multiple injection control means for allowing a plurality of fuel injections during each cycle in the homogeneous operation. The multiple injection control means varies time intervals between injections and injection amounts for the respective injections according to the engine speed and load. (See Japanese Patent Application Publication No. JP-A-2002-161790, for example.)

Also, there is proposed a related art providing a fuel injection device for an engine having an ignition plug disposed in the center of a combustion chamber when viewed in the cylinder axis direction and a fuel injector for injecting fuel provided to face the combustion chamber. In the fuel injection device, a fuel injection port of the fuel injector is disposed at a periphery of the combustion chamber on an intake port side when viewed in the cylinder axis direction. The fuel injection device is provided with injection control means for controlling the fuel injector such that fuel injection is started during a first half of an intake stroke of the cylinder, and such that a plurality of multiple fuel injections are performed during an intake stroke. (See Japanese Patent Application Publication No. JP-A-10-159619, for example.)

In the former related art, however, the penetration of fuel spray is limited. Also, fuel may ride on an intake air flow at an excessive speed and thus an increased amount of fuel collides against the cylinder bore wall. The fuel adheres to the cylinder bore wall and flows via a piston ring into an oil pan, where the fuel dilutes oil, which deteriorates the engine quality.

In the full-load range where the homogeneity of air-fuel mixture and the utilization of the effect of latent heat of fuel evaporation and the effect of disturbance by a fuel jet are both desirable, in particular, fuel injection timing in the range where the piston speed is maximum is unavoidable.

In the related art according to Japanese Patent Application Publication No. JP-A-10-159619 mentioned above, fuel is not injected during an intermediate period of an intake stroke. However, because the absence of fuel injection is not because of an injection prohibition period set for positive prohibition, fuel is highly likely to be injected even during an intermediate period of an intake stroke if injection of a larger amount of fuel is demanded, which may lead to the problem of oil dilution described above.

SUMMARY OF THE INVENTION

The present invention provides a direct injection spark ignition internal combustion engine that, by not injecting fuel when the piston speed is highest, when multiple injections are to be performed during an intake stroke, for example, reduces the oil dilution by fuel that has struck the cylinder bore wall, and that effectively utilizes the latent heat of fuel evaporation and the effect of disturbance by a fuel jet, during homogeneous combustion to improve the homogeneity of an air-fuel mixture, and a fuel injection control method for such an internal combustion engine.

A first aspect of the present invention is directed to a direct injection spark ignition internal combustion engine that includes a fuel injector that faces a combustion chamber and injects fuel such that the injected fuel rides on an intake air flow generated in the combustion chamber; and fuel injection control means for executes control such that the fuel injector performs a plurality of fuel injections to inject a necessary amount of fuel during an intake stroke, or from an intake stroke to the first half of a compression stroke, when homogeneous combustion is to be performed. In particular, the direct injection spark ignition internal combustion engine is characterized in that the fuel injection control means sets an injection prohibition period, during which injection of fuel is prohibited, to the middle of the intake stroke.

According to the first aspect, the injection prohibition period is set to avoid injection when the piston speed is fastest, when multiple injections are to be performed in an intake stroke during homogeneous combustion. Thus, it is possible to prevent injected fuel from riding on an intake air flow at an excessive speed and colliding against the cylinder bore wall, and thus to reduce oil dilution. In addition, the number of the multiple injections, the injection amount, the starting time of each injection, and the ratio in amount of each injection are set in an optimum way, when multiple injections are to be performed before and after the injection prohibition period. Thus, it is possible to improve the homogeneity of the air-fuel mixture by effectively using the latent heat of fuel evaporation and the effect of disturbance by a fuel jet.

A second aspect of the present invention is directed to the direct injection spark ignition internal combustion engine according to the first aspect, in which the fuel injection control means sets a shorter injection prohibition period as the speed of the internal combustion engine increases.

According to the second aspect, the injection timings may be advanced in accordance with the time for fuel to evaporate, as the speed of the engine increases, where oil dilution due to fuel collision against the cylinder bore wall is reduced. Thus, the freedom in setting the injection timings can be increased.

A third aspect of the present invention is directed to the direct injection spark ignition internal combustion engine according to the first or second aspect, in which the fuel injection control means sets a shorter injection prohibition period as the intake air pressure increases.

According to the third aspect, the injection timings may be advanced, in accordance with the time for fuel to evaporate, as the intake air pressure is higher, where the flying distance of the fuel spray is shorter and thus oil dilution due to fuel collision against the cylinder bore wall is reduced. Thus, the freedom in setting the injection timings can be increased.

A fourth aspect of the present invention is directed to the direct injection spark ignition internal combustion engine according to any one of the first to third aspects, in which the fuel injection control means decreases the amount of fuel to be injected before the injection prohibition period, and increases the amount of fuel to be injected after the injection prohibition period, as the internal combustion engine speed decreases.

According to the fourth aspect, utilization of the latent heat of fuel evaporation and the effect of disturbance by a fuel jet is allowed as the speed of the internal combustion engine decreases, because there is enough time for fuel to evaporate and be mixed with air. Meanwhile, priority is given to the homogeneity of the air-fuel mixture as the speed of the engine increases, because there is insufficient time for the fuel to evaporate and be mixed with air.

A fifth aspect of the present invention is directed to a fuel injection control method for a direct injection spark ignition internal combustion engine, in which the direct injection type spark ignition internal combustion engine includes a fuel injector that faces a combustion chamber and configured to inject fuel such that the injected fuel rides on an intake air flow generated in the combustion chamber; and fuel injection control means for executing control such that the fuel injector performs a plurality of fuel injections to inject a necessary amount of fuel during an intake stroke, or from an intake stroke to a first half of a compression stroke, when homogeneous combustion is to be performed. The fuel injection control method includes setting an injection prohibition period, in which injection of the fuel is prohibited, to the middle of the intake stroke.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of a direct injection spark ignition internal combustion engine (hereinafter occasionally referred to as "engine") according to the present invention is described below with reference to the drawings. However, the present invention is not limited to the described embodiment.

Figure 2:
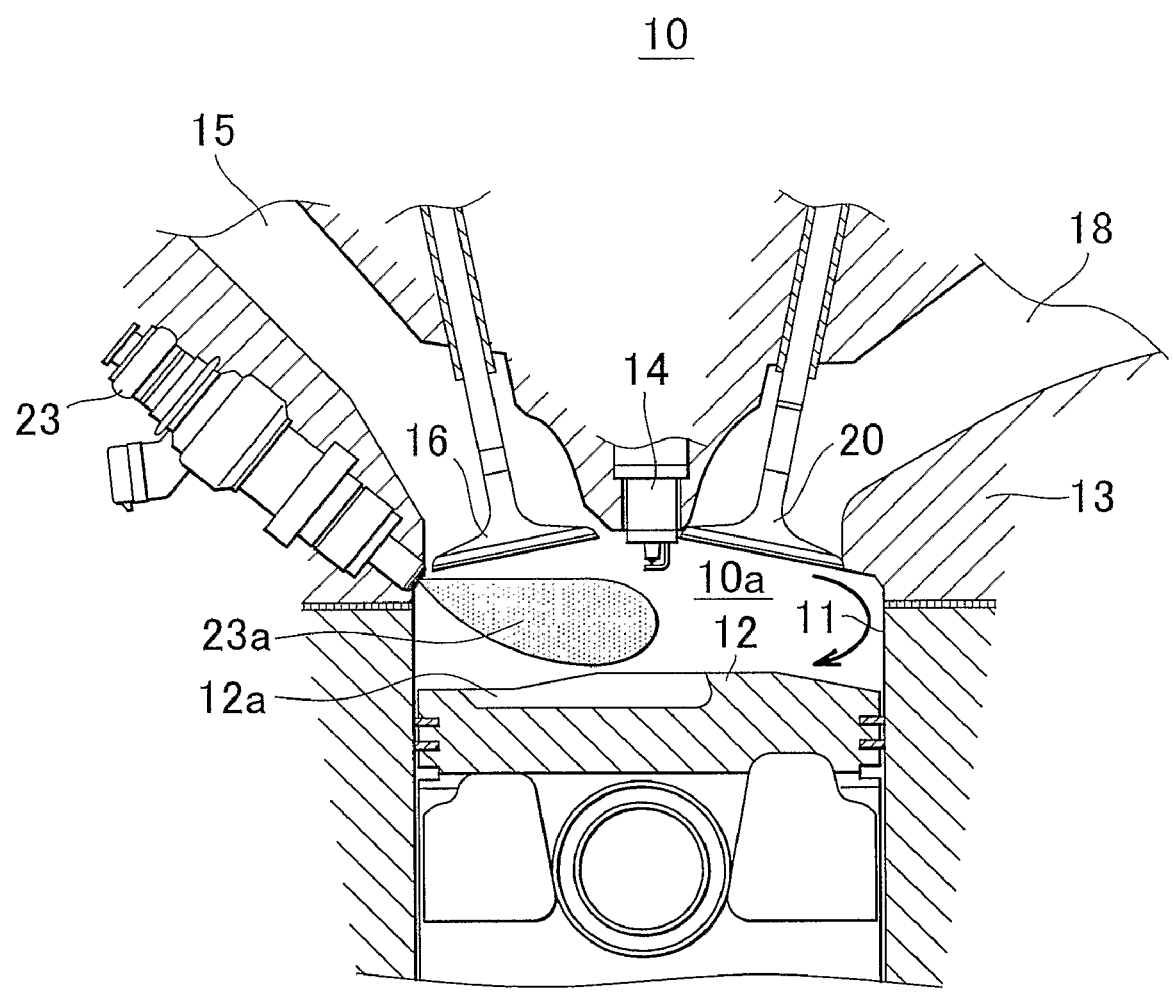
FIG. 2 is a cross sectional view showing the general construction of the engine.

First of all, a description is made of an engine to which the present invention is applied with reference to FIG. 2. FIG. 2 is a cross sectional view showing the general construction of the engine. As shown in FIG. 2, an engine 10 is a 4-stroke gasoline direct injection engine, in which fuel spray 23a is directly injected from a fuel injector 23 into a combustion chamber 10a. The engine 10 is configured to be switchable between stratified combustion and homogeneous combustion by a known art.

The combustion chamber 10a of the engine 10 is defined by a cylinder bore wall 11, a cylinder head 13, and a piston 12 reciprocally disposed in the cylinder bore wall 11. A recessed cavity 12a, which allows stratified combustion, is formed in a portion of the top surface of the piston 12 on the air intake side.

An ignition plug 14 that ignites an air-fuel mixture is disposed at approximately the center of the combustion chamber 10a. An intake valve 16 is disposed at an intake port 15 facing the combustion chamber 10a, and an exhaust valve 20 is disposed at an exhaust port 18 facing the combustion chamber 10a. The intake valves 16 and exhaust valves 20 are controlled to open and close by a variable valve timing mechanism (not shown).

Although not shown, a catalyst for purifying smoke, NOx, HC or the like in an exhaust gas is provided in an exhaust passage of the engine 10. The engine 10 includes various sensors for detecting various data necessary for operation, such as engine speed and intake air pressure.

An electronic control unit (ECU) (not shown) controls various components, such as the intake valve 16, the exhaust valve 20, the ignition plug 14, the fuel injector 23, and the variable valve timing mechanism, according to the output values of the various sensors and so forth.

Figure 3:
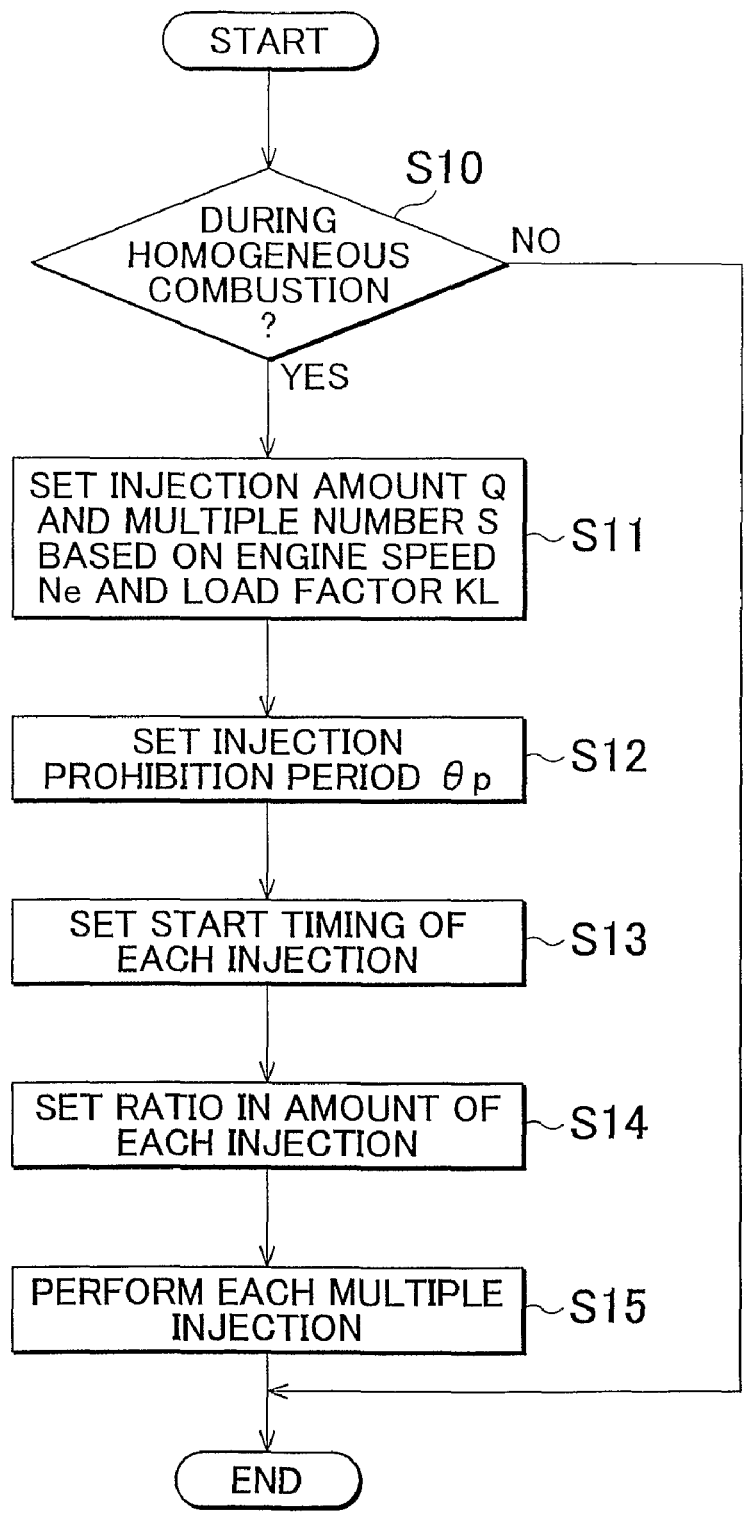
FIG. 3 is a flowchart showing a control method.

Now, a control method according to this embodiment will be described with reference to FIG. 3. FIG. 3 is a flowchart showing the control method. The control described below is executed by the ECU at a specific intervals.

First, it is determined whether or not the control is executed under the homogeneous combustion (step S10), which is a subject of the control. In other words, it is determined whether or not a fuel injection is executed during an intake stroke. This determination can be made easily, since the engine 10 is configured to be switchable between stratified combustion and homogeneous combustion and the current combustion mode is known. If it is determined that the control is not executed under the homogeneous combustion ("No" in step S10), and the process ends.

Figure 4:
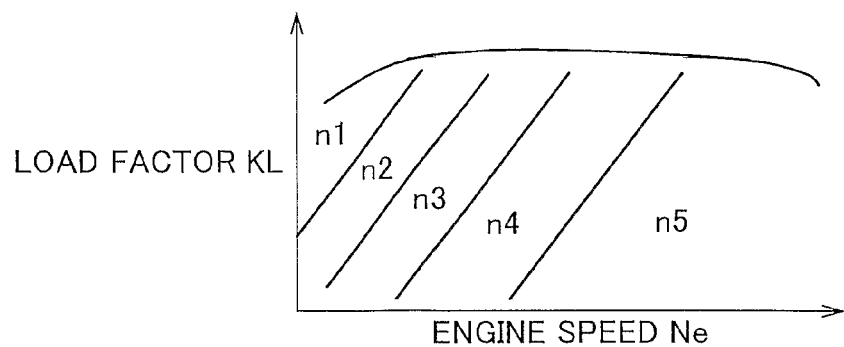
FIG. 4 is a map for obtaining the number of multiple injections based on an engine speed Ne and a load factor KL.

If it is determined that the control is executed under the homogeneous combustion ("Yes" in step S10), a necessary injection amount Q is calculated and set based on current speed Ne and load factor KL of the engine 10, which are read or calculated in advance, and a number of multiple injections S is set using the map shown in FIG. 4, for example (step S11). FIG. 4 shows a map for obtaining the number of multiple injections (for example, n1, n2, . . . , n5) based on the speed Ne and the load factor KL of the engine 10, which may be empirically determined, etc.

Figure 1:
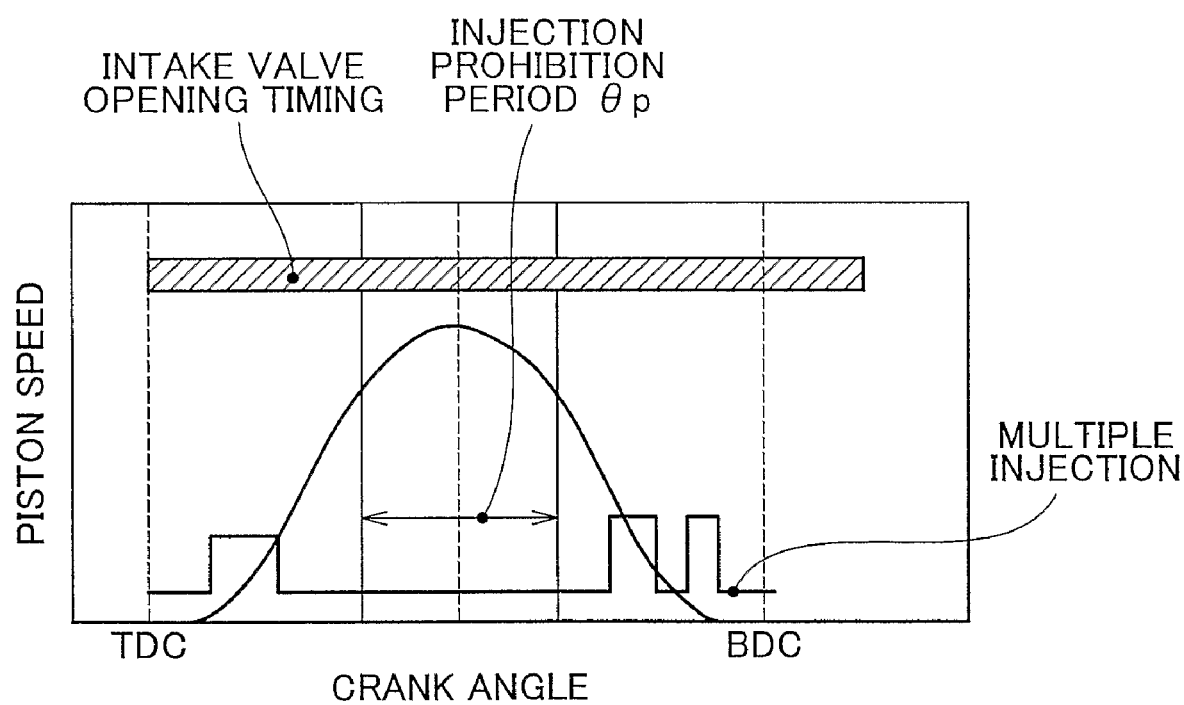
FIG. 1 is a diagram for explaining an injection prohibition period θp for a direct injection spark ignition internal combustion engine according to an embodiment of the present invention.

Then, an injection prohibition period θp is set (step S12). The injection prohibition period θp is set to avoid injecting fuel when the speed of the piston 12 is fastest, as shown in FIG. 1, when multiple injections (three multiple injections in the example shown) are to be performed during an intake stroke. FIG. 1 explains the injection prohibition period θp for the direct injection type spark ignition internal combustion engine according to the embodiment of the present invention. Specifically, the injection prohibition period θp is set in a manner described below.

Figure 5:
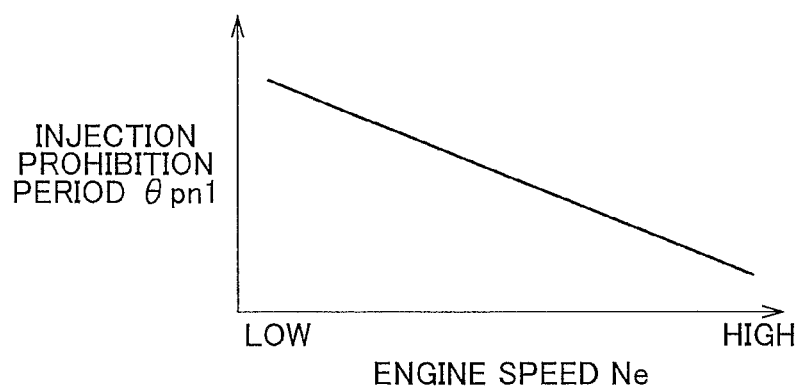
FIG. 5 is a map for obtaining an injection prohibition period θpn1 based on the engine speed Ne.

The injection prohibition period θp is reduced as the speed Ne of the engine 10 increases, as shown in FIG. 5. The set value is defined as an injection prohibition period θpn1. FIG. 5 is a map for determining the injection prohibition period θpn1 based on the speed Ne of the engine 10, which is prepared in advance through experiments, etc.

With the above setting, the injection timings may be advanced, in accordance with the time required for fuel to evaporate. Thus, as the speed Ne of the engine 10 increases, oil dilution by fuel that strikes the cylinder bore wall 11 is reduced.

Figure 6:
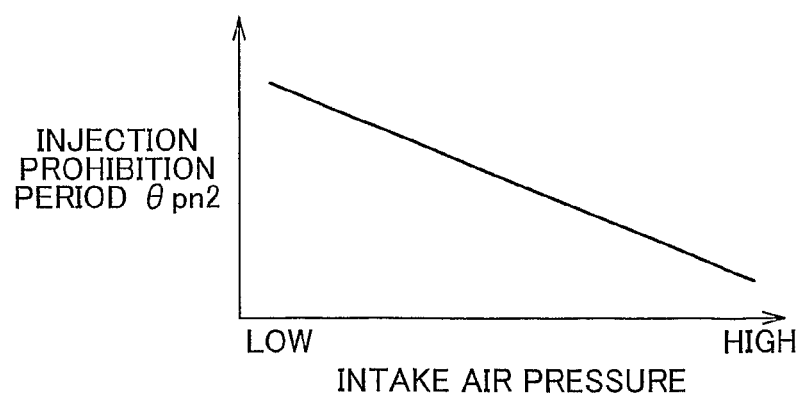
FIG. 6 is a map for obtaining an injection prohibition period θpn2 based on an intake air pressure.

Also, the injection prohibition period θp is reduced as the intake air pressure increases, as shown in FIG. 6. The set value is defined as an injection prohibition period θpn2. FIG. 6 is a map for determining the injection prohibition period θpn2 based on the intake air pressure, which is prepared in advance through experiments, etc.

With the above setting, the injection timings may be advanced in accordance with the time for fuel to evaporate. Thus, when the intake air pressure increases, the flying distance of the fuel spray 23a is reduced, which reduces oil dilution by fuel that strikes the cylinder bore wall 11.

The longer of the prohibition periods θpn1 and θpn2 is then set as the injection prohibition period θp (step S12).

Then, the starting time of each of the multiple injections is set (step S13) in accordance with the injection prohibition period θp. For example, the starting time of a first injection (see injection start timings ainj1_1 to ainj1_5 of FIG. 7), the starting time of a second injection (see injection start timings ainj2_1 to ainj2_5 of FIG. 8), and the starting time of an n-th injection (see injection start timings ainjn_1 to ainjn_5 of FIG. 9) are sequentially obtained based on the speed Ne and the load factor KL of the engine 10, using the maps of FIGS. 7 to 9.

Figure 7:
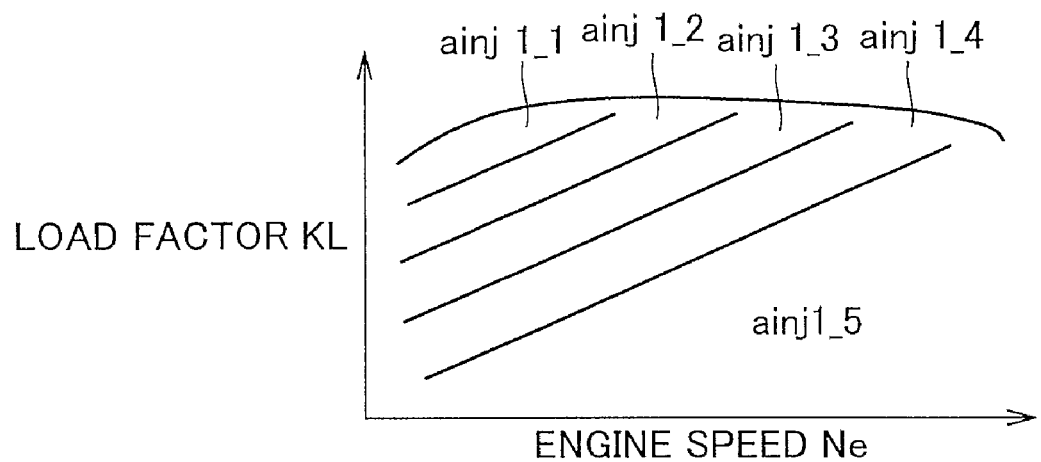
FIG. 7 is a map for obtaining the starting time for a first injection based on the engine speed Ne and the load factor KL.
Figure 8:
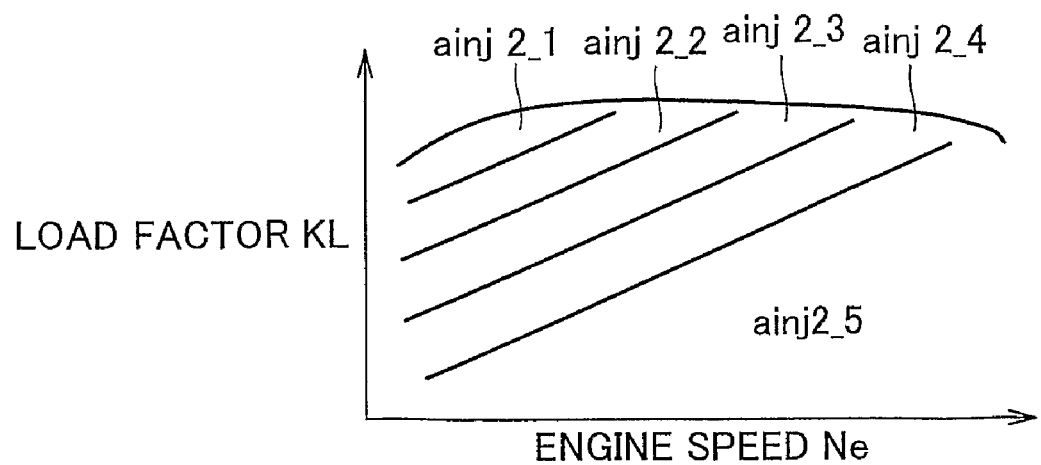
FIG. 8 is a map for obtaining the starting time for a second injection based on the engine speed Ne and the load factor KL.
Figure 9:
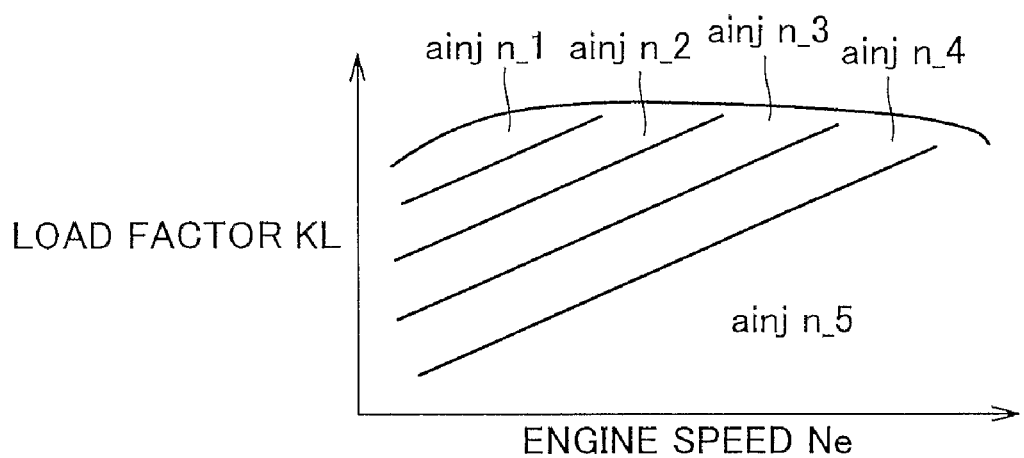
FIG. 9 is a map for obtaining the starting time for an n-th injection based on the engine speed Ne and the load factor KL.

FIG. 7 is a map for determining the starting time of the first injection based on the speed Ne and the load factor KL of the engine 10, FIG. 8 is a map for determining the starting time of the second injection based on the speed Ne and the load factor KL of the engine 10, and FIG. 9 is a map for determining the starting time of the n-th injection based on the speed Ne and the load factor KL of the engine 10, which are prepared in advance through experiments, etc.

Then, the fuel injection amount of each of the multiple injections is set (step S14) in accordance with the injection prohibition period θp. That is, the fuel injection amount injected before the injection prohibition period θp (advanced side injection ratio) is reduced, and the fuel injection amount injected after the injection prohibition period θp is increased, as the speed Ne of the engine 10 decreases, as shown in FIG. 10.

With this setting, utilizing of the latent heat of fuel evaporation and the effect of disturbance by a fuel jet is possible because the speed Ne of the engine 10 is slower. Thus, there is enough time for fuel to evaporate and be mixed with air. On the other hand, priority is given to the homogeneity of the air fuel mixtures as the speed Ne of the engine 10 increases, because there is insufficient time for the fuel to evaporate and be mixed with air.

Figure 10:
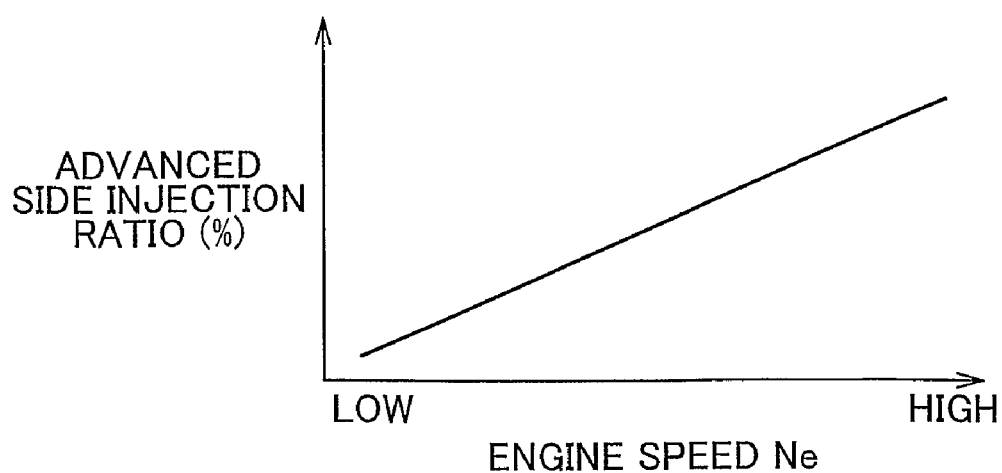
FIG. 10 is a map for obtaining a ratio of injection amount injected before the injection prohibition period θp (advanced side injection ratio) in an entire injection amount based on the engine speed Ne.

FIG. 10 is a map for determining the ratio of the fuel injection amount injected before the injection prohibition period θp (advanced side injection ratio) in the entire fuel injection amount based on the speed Ne of the engine 10, which is prepared in advance through experiments, etc.

Each of the multiple injections is performed (step S15) based on the injection amount Q, the number of multiple injections S, the starting time of each injection, and the fuel injection amount in each multiple injection and not during the injection prohibition period θp.

In this way, it is possible to prevent injected fuel from riding on the intake air flow at an excessive speed and striking against the cylinder bore wall 11, and thus to reduce oil dilution, during homogeneous combustion, especially in the full-load range. In addition, it is possible to improve the homogeneity of the air-fuel mixture by effectively using the latent heat of fuel evaporation and the effect of disturbance by a fuel jet.

In the above embodiment, three multiple injections are performed during an intake stroke, as shown in FIG. 1. However, the present invention may encompass a greater number of multiple injections during an intake stroke, or from an intake stroke to a first half of a compression stroke.

In the above embodiment, the present invention is applied to an engine 10 that has the ignition plug 14 at approximately the center of the combustion chamber 10a and in which fuel is injected from the intake port side, as shown in FIG. 2. However, the present invention is not limited to such an arrangement.

That is, the fuel injector, the ignition plug and so forth may be disposed in any way as long as the nozzle of the fuel injector is faces the combustion chamber and injected fuel rides on the intake air flow generated in the combustion chamber.

The invention claimed is:

1. A direct injection spark ignition internal combustion engine comprising:
    a fuel injector that faces a combustion chamber and configured to inject fuel such that the injected fuel rides on an intake air flow generated in the combustion chamber; and
    a fuel injection control device that performs control such that the fuel injector performs a plurality of fuel injections to inject a necessary amount of fuel during an intake stroke, or from an intake stroke to a first half of a compression stroke so that homogeneous combustion is to be performed;
    wherein the fuel injection control device sets an injection prohibition period, in which injection of the fuel is prohibited, to a middle of the intake stroke; and
    the fuel injection control device reduces the injection prohibition period as a speed of the internal combustion engine increases.

2. The direct injection spark ignition internal combustion engine according to claim 1, wherein the fuel injection control device decreases an amount of fuel to be injected before the injection prohibition period, and increases the amount of fuel to be injected after the injection prohibition period, as the internal combustion engine speed decreases.

3. The direct injection spark ignition internal combustion engine according to claim 1, wherein the fuel injection control device sets the injection prohibition period to a period that a speed of a piston is fastest.

4. A direct injection spark ignition internal combustion engine comprising:
   a fuel injector that faces a combustion chamber and configured to inject fuel such that the injected fuel rides on an intake air flow generated in the combustion chamber; and
   a fuel injection control device that performs control such that the fuel injector performs a plurality of fuel injections to inject a necessary amount of fuel during an intake stroke, or from an intake stroke to a first half of a compression stroke so that homogeneous combustion is to be performed;
   wherein the fuel injection control device sets an injection prohibition period, in which injection of the fuel is prohibited, to a middle of the intake stroke; and
   the fuel injection control device reduces the injection prohibition period as an intake air pressure increases.

5. The direct injection spark ignition internal combustion engine according to claim 4, wherein the fuel injection control device decreases an amount of fuel to be injected before the injection prohibition period, and increases the amount of fuel to be injected after the injection prohibition period, as the internal combustion engine speed decreases.

6. The direct injection spark ignition internal combustion engine according to claim 4, wherein the fuel injection control device sets the injection prohibition period to a period that a speed of a piston is fastest.

7. A method of controlling fuel injection in a direct injection spark ignition internal combustion engine, wherein the direct injection spark ignition internal combustion engine includes: a fuel injector that faces a combustion chamber and injects fuel such that the injected fuel rides on an intake air flow generated in the combustion chamber; and a fuel injection control device that controls such that the fuel injector performs a plurality of fuel injections to inject a necessary amount of fuel during an intake stroke, or from an intake stroke to a first half of a compression stroke, when homogeneous combustion is to be performed, the fuel injection control method comprising:
   setting an injection prohibition period, in which injection of the fuel is prohibited, to a middle of the intake stroke, wherein the injection prohibition period is reduced as a speed of the internal combustion engine increases.

8. The fuel injection control method according to claim 7, wherein an amount of fuel to be injected before the injection prohibition period is reduced, and the amount of fuel to be injected after the injection prohibition period is increased, as the internal combustion engine speed decreases.

9. The fuel injection control method according to claim 7, wherein the injection prohibition period is set to a period that a speed of a piston is fastest.

10. A method of controlling fuel injection in a direct injection spark ignition internal combustion engine, wherein the direct injection spark ignition internal combustion engine includes: a fuel injector that faces a combustion chamber and injects fuel such that the injected fuel rides on an intake air flow generated in the combustion chamber; and a fuel injection control device that controls such that the fuel injector performs a plurality of fuel injections to inject a necessary amount of fuel during an intake stroke, or from an intake stroke to a first half of a compression stroke, when homogeneous combustion is to be performed, the fuel injection control method comprising:
    setting an injection prohibition period, in which injection of the fuel is prohibited, to a middle of the intake stroke, wherein the injection prohibition period is reduced as a speed of the internal combustion engine increases.

11. The fuel injection control method according to claim 10, wherein an amount of fuel to be injected before the injection prohibition period is reduced, and the amount of fuel to be injected after the injection prohibition period is increased, as the internal combustion engine speed decreases.

12. The fuel injection control method according to claim 10, wherein the injection prohibition period is set to a period that a speed of a piston is fastest.

* * * * *